United States Patent
Yamasaki (10) Patent No.: US 10,960,478 B2
(45) Date of Patent: Mar. 30, 2021

(54) ELECTRIC DISCHARGE MACHINE (71) Applicant: FANUC CORPORATION, Yamanashi (JP)

(72) Inventor: Mizuho Yamasaki, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 115 days.

(21) Appl. No.: 16/275,863

(22) Filed: Feb. 14, 2019

(65) Prior Publication Data

US 2019/0255637 A1 Aug. 22, 2019

(30) Foreign Application Priority Data

Feb. 16, 2018 (JP) .............................. JP2018-026268

(51) Int. Cl.
  *B23H 1/10* (2006.01)
  *G01F 23/14* (2006.01)
  *B23H 1/02* (2006.01)
  *B23H 7/02* (2006.01)

(52) U.S. Cl.
  CPC ................. *B23H 1/10* (2013.01); *B23H 1/02* (2013.01); *G01F 23/14* (2013.01); *B23H 7/02* (2013.01)

(58) Field of Classification Search
  CPC .... B23H 1/02; B23H 1/10; B23H 7/02; G01F 23/14
  See application file for complete search history.

(56) References Cited

U.S. PATENT DOCUMENTS

| 5,028,758 A * | 7/1991 | Hori ......................... B23H 7/04 219/69.12 |
| 5,071,567 A * | 12/1991 | Corcelle .............. B01D 37/046 210/744 |
| 7,930,938 B2 * | 4/2011 | Lopushansky .......... G01F 23/14 73/299 |
| 2006/0219668 A1 | 10/2006 | Kawahara et al. |
| 2014/0083536 A1 * | 3/2014 | Yoshizaki ................ B23H 1/10 137/565.17 |
| 2017/0087656 A1 | 3/2017 | Hasegawa |
| 2019/0025099 A1 * | 1/2019 | Asahara ..................... G01F 1/34 |

FOREIGN PATENT DOCUMENTS

| CN | 205950037 U | 2/2017 |
| JP | S59232734 A | 12/1984 |
| JP | S60085829 A | 5/1985 |
| JP | 523918 A | 2/1993 |

(Continued)

OTHER PUBLICATIONS

Machine translation of KR-20140010770A, Aug. 2020.*

(Continued)

*Primary Examiner* — Geoffrey S Evans
(74) *Attorney, Agent, or Firm* — Fredrikson & Byron, P.A.

(57) ABSTRACT

An electric discharge machine is configured to perform electric discharge machining on a workpiece in a working fluid stored in a work-pan. The electric discharge machine includes: a measurement piping coupled to the work-pan and having an air space inside; a pressure sensor configured to detect a pressure of the air space; and a working fluid supply portion configured to supply the working fluid to the measurement piping.

6 Claims, 5 Drawing Sheets

(56) References Cited

FOREIGN PATENT DOCUMENTS

| JP | H09216130 A | | 8/1997 |
|---|---|---|---|
| JP | 1043954 A | | 2/1998 |
| JP | 2006281395 A | | 10/2006 |
| JP | 2009279727 A | | 12/2009 |
| JP | 4850316 B | | 1/2012 |
| JP | 201764804 A | | 4/2017 |
| KR | 20140010770 A | * | 1/2014 |

OTHER PUBLICATIONS

English Machine Translation of Decision to Grant a Patent mailed by Japan Patent Office (JPO) for Application No. JP2018-026268, dated Jun. 23, 2020, 2 pages.

Untranslated Decision to Grant a Patent mailed by Japan Patent Office (JPO) for Application No. JP2018-026268, dated Jun. 23, 2020, 3 pages.

English Machine Translation of Notification of Reasons for Refusal mailed by Japan Patent Office (JPO) for Application No. JP2018-026268, dated Feb. 4, 2020, 4 pages.

Untranslated Notification of Reasons for Refusal mailed by Japan Patent Office (JPO) for Application No. JP2018-026268, dated Feb. 4, 2020, 4 pages.

English Abstract for Japanese Publication No. 2017064804 A, published Apr. 6, 2017, 1 pg.

English Abstract for Japanese Publication No. 2006281395 A, published Oct. 19, 2006, 2 pgs.

English Abstract and Machine Translation for Japanese Publication No. 10-043954 A, published Feb. 17, 1998, 7 pgs.

English Abstract and Machine Translation for Japanese Publication No. 05-023918 A, published Feb. 2, 1993, 7 pgs.

English Abstract and Machine Translation for Japanese Publication No. JPS59-232734A, published Dec. 27, 1984, 3 pgs.

English Abstract and Machine Translation for Chinese Publication No. 205950037 U, published Feb. 15, 2017, 8 pgs.

Extended European Search Report for European Patent Application No. 19157156.1, dated Jul. 19, 2019, 6 pgs.

English Abstract and Machine Translation for Japanese Publication No. JPS60-085829A, published May 15, 1985, 6 pgs.

English Abstract and Machine Translation for Japanese Publication No. JPH09-216130A, published Aug. 19, 1997, 13 pgs.

English Abstract and Machine Translation for Japanese Publication No. JP2009-279727A, published Dec. 3, 2009, 11 pgs.

English Abstract and Machine Translation for Japanese Publication No. JP4850316B, published Jan. 11, 2012, 13 pgs.

* cited by examiner

ELECTRIC DISCHARGE MACHINE

CROSS-REFERENCE TO RELATED APPLICATION

This application is based upon and claims the benefit of priority from Japanese Patent Application No. 2018-026268 filed on Feb. 16, 2018, the contents of which are incorporated herein by reference.

BACKGROUND OF THE INVENTION

Field of the Invention

The present invention relates to an electric discharge machine which performs electric discharge machining on a workpiece in a working fluid stored in a work-pan.

Description of the Related Art

In electric discharge machines, the level of a working fluid stored in the work-pan is measured in order to keep the level of the working fluid approximately constant. Japanese Laid-Open Patent Publication No. 2017-064804 discloses a wire electric discharge machine in which the air pressure inside a measurement piping routed from a bottom portion of a work-pan to the outside of the work-pan is detected by a pressure sensor and the level of the working fluid stored in the work-pan is measured in accordance with the air pressure.

SUMMARY OF THE INVENTION

However, in the technique disclosed in Japanese Laid-Open Patent Publication No. 2017-064804, sludge produced by electric discharge machining may enter the measurement piping from the work-pan and accumulate therein. If sludge accumulates in the measurement piping, there is a concern that the pressure sensor might detect the pressure incorrectly or cannot detect the pressure due to the accumulated sludge, resulting in deteriorated sensing accuracy with respect to the level of the working fluid stored in the work-pan.

Accordingly, an object of the present invention is to provide an electric discharge machine capable of reducing accumulation of sludge inside a measurement piping.

According to an aspect of the present invention, an electric discharge machine configured to perform electric discharge machining on a workpiece in a working fluid stored in a work-pan includes: a measurement pipe coupled to the work-pan and having an air space inside; a pressure sensor configured to detect a pressure at the air space; and a working fluid supply portion configured to supply the working fluid to the measurement pipe.

According to the electric discharge machine of the aspect above, it is possible to force the sludge that has entered the measurement pipe from the work-pan to flow to the work-pan by the working fluid supplied to the measurement pipe. Thus, according to the electric discharge machine of the aspect above, it is possible to reduce accumulation of the sludge inside the measurement pipe.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

An electric discharge machine according to the present invention will be described in detail below in conjunction with preferred embodiments with reference to the accompanying drawings.

Figure 1:
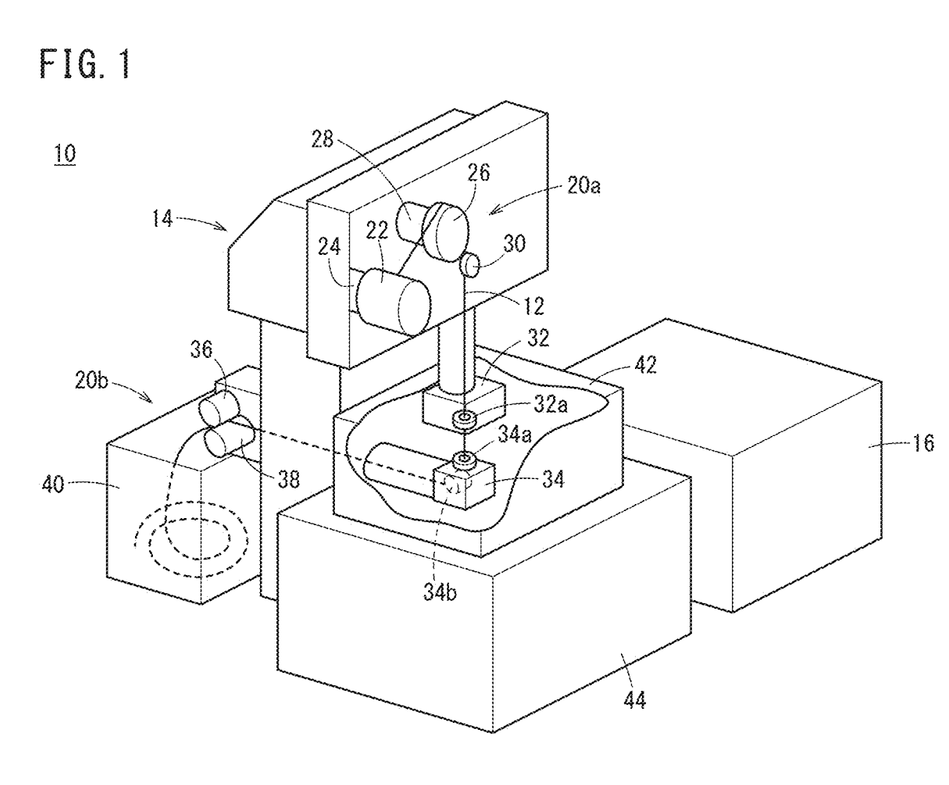
FIG. 1 is a schematic configuration diagram of an electric discharge machine according to an embodiment.

FIG. 1 is a schematic configuration diagram of an electric discharge machine 10. The electric discharge machine 10 is a wire electric discharge machine that performs, in a (dielectric) working fluid, electric discharge machining on a workpiece (an object to be worked on (not shown)) by electric discharge occurring between a wire electrode 12 and the workpiece. The material of the wire electrode 12 can be a metal material, for example, a tungsten-based, copper-alloy-based, or brass-based metal material. On the other hand, the material of the workpiece can be, for example, an iron-based or super-hard metal material.

The electric discharge machine 10 chiefly includes a main machine body 14 and a dielectric fluid unit 16. The main machine body 14 includes a supplying system 20a for supplying the wire electrode 12 to the workpiece and a collecting system 20b for collecting the wire electrode 12 from the workpiece.

The supplying system 20a includes a wire bobbin 22 on which the wire electrode 12 is wound, a torque motor 24 for applying torque to the wire bobbin 22, a brake shoe 26 for applying a braking force by friction to the wire electrode 12, a brake motor 28 for applying brake torque to the brake shoe 26, a tension detector 30 for detecting the magnitude of tension of the wire electrode 12, and an upper wire guide 32 for guiding the wire electrode 12.

The collecting system 20b includes a lower wire guide 34 for guiding the wire electrode 12, a pinch roller 36 and a supply roller 38 which can hold the wire electrode 12 therebetween, and a wire collection box 40 for collecting the wire electrode 12 conveyed by the pinch roller 36 and the supply roller 38.

The main machine body 14 includes a work-pan 42 in which a working fluid of deionized water used in electric discharge machining can be stored, and the upper wire guide 32 and the lower wire guide 34 are disposed in the work-pan 42. The work-pan 42 is placed on a base portion 44. The workpiece is provided between the upper wire guide 32 and the lower wire guide 34. The upper wire guide 32 and lower wire guide 34 have die guides 32a, 34a for supporting the wire electrode 12. Further, the lower wire guide 34 includes a guide roller 34b for guiding the wire electrode 12 to the pinch roller 36 and supply roller 38 while changing the direction of the wire electrode 12.

The workpiece is supported by a table (not shown) provided on the base portion 44, and the table is disposed in the work-pan 42. The main machine body 14 (electric discharge machine 10) processes the workpiece while relatively moving the position of the table and the position of the wire electrode 12 supported by the die guides 32a, 34a.

The dielectric fluid unit 16 is a device that removes sludge produced in the work-pan 42 from the working fluid and returns the sludge-removed working fluid to the work-pan 42. The dielectric fluid unit 16 may be configured to control the quality of the working fluid by adjusting the temperature, electric resistivity, etc. of the working fluid.

Figure 2:
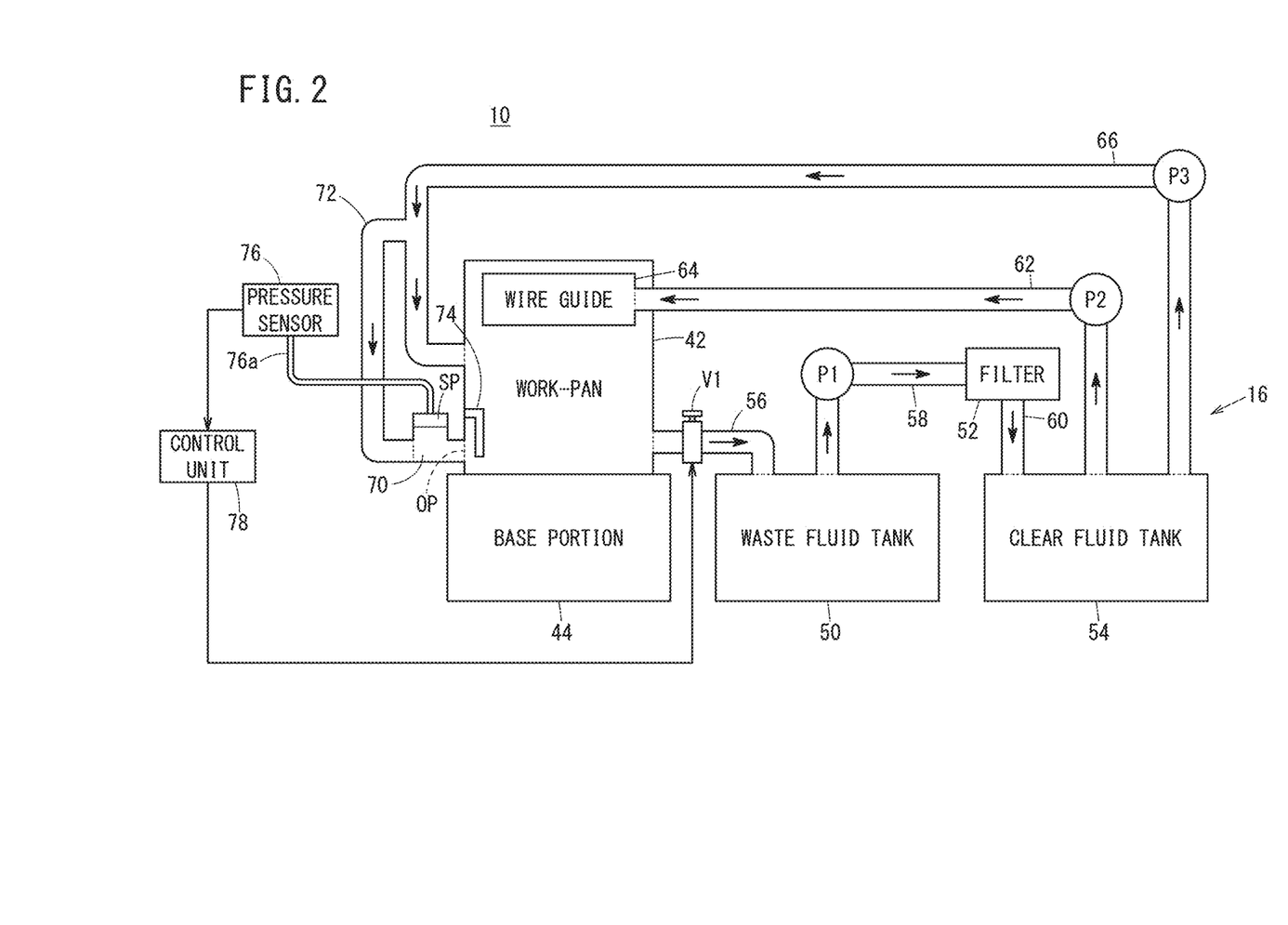
FIG. 2 is a diagram showing the configuration of main parts of the electric discharge machine of the embodiment.

FIG. 2 is a diagram showing the configuration of main parts of the electric discharge machine 10, especially the configuration of the dielectric fluid unit 16. The dielectric fluid unit 16 includes at least a waste fluid tank 50, a filter 52, and a clear fluid tank 54. The waste fluid tank 50 temporarily stores the working fluid discharged from the work-pan 42 through a discharge pipe 56. The discharge pipe 56 is a pipe for supplying the working fluid from the work-pan 42 to the waste fluid tank 50, and a valve V1 is provided to the discharge pipe 56. The valve V1 is opened and closed by an actuator not shown.

The working fluid in the work-pan 42 contains sludge produced by electric discharge machining, and therefore the working fluid discharged from the work-pan 42 to the waste fluid tank 50 contains sludge. That is to say, the waste fluid tank 50 temporarily stores the working fluid contaminated with sludge.

The working fluid stored in the waste fluid tank 50 is pumped up by a pump P1 and supplied to the filter 52 through a convey pipe 58. The convey pipe 58 is a pipe for supplying the working fluid from the waste fluid tank 50 to the filter 52, and the pump P1 is provided to the convey pipe 58.

The working fluid filtered by the filter 52 (the working fluid passed through the filter 52) is sent to the clear fluid tank 54 through a convey pipe 60. The filter 52 is configured to remove the sludge from the working fluid, and the convey pipe 60 is a pipe for supplying the working fluid passed through the filter 52 to the clear fluid tank 54. The working fluid in the waste fluid tank 50 is thus passed through the filter 52, and the working fluid, from which sludge has been removed, can be sent to the clear fluid tank 54.

The clear fluid tank 54 temporarily stores the working fluid from which sludge has been removed. The working fluid stored in the clear fluid tank 54 is pumped up by a pump P2 and sent to the wire guide 64 through a first supply pipe 62. The first supply pipe 62 is a pipe for supplying the working fluid stored in the clear fluid tank 54 to the wire guide 64, and the pump P2 is provided to the first supply pipe 62.

The wire guide 64 represents both of the upper wire guide 32 and the lower wire guide 34, or represents the upper wire guide 32. The wire guide 64 blows out the sludge-removed working fluid. By performing electric discharge machining while blowing out the working fluid from the wire guide 64, it is possible to fill the space between the wire electrode 12 and the workpiece with the clear working fluid suitable for electric discharge machining, preventing deterioration of accuracy of the electric discharge machining due to sludge.

Further, the working fluid stored in the clear fluid tank 54 is pumped up by a pump P3 and supplied to the work-pan 42 through a second supply pipe 66. The second supply pipe 66 is a pipe for supplying the working fluid stored in the clear fluid tank 54 to the work-pan 42, and the pump P3 is provided to the second supply pipe 66.

The working fluid flows in the second supply pipe 66 at a lower pressure than that flowing in the first supply pipe 62. Methods for supplying the working fluid at a lower pressure in the second supply pipe 66 than that flowing in the first supply pipe 62 include, for example, a method in which the inner diameter of the second supply pipe 66 is set larger than the inner diameter of the first supply pipe 62, and a method in which the power of the pump P3 provided to the second supply pipe 66 is set smaller than the power of the pump P2 provided to the first supply pipe 62.

The electric discharge machine 10 includes a measurement piping 70 for measuring a fluid level of the work-pan 42, a working fluid supply portion 72 for supplying the working fluid to the measurement piping 70, and a cover member 74 for suppressing entrance of the sludge from the work-pan 42 into the measurement piping 70. The electric discharge machine 10 further includes a pressure sensor 76 configured to detect an air pressure in the measurement piping 70, and a control unit 78 configured to control the dielectric fluid unit 16 based on the results of detection by the pressure sensor 76.

The measurement piping 70 is a pipe used to measure the level of the fluid stored in the work-pan 42 and coupled to a side wall of the work-pan 42. The measurement piping 70 has an air space SP inside. The air space SP is a space surrounded by inner walls of the measurement piping 70 and the working fluid that has entered the measurement piping 70 from the work-pan 42.

For example, an upper wall portion of the measurement piping 70 is formed to protrude outward and a space inside the projecting wall portion constitutes the air space SP. The measurement piping 70 of this embodiment is positioned more upward than the bottom wall of the work-pan 42. This reduces entrance of the sludge accumulated on the bottom wall of the work-pan 42 into the measurement piping 70.

The working fluid supply portion 72 is configured to supply the working fluid to the measurement piping 70. The working fluid supply portion 72 of this embodiment is a pipe that branches off from the second supply pipe 66 and is connected to the measurement piping 70, which supplies part of the working fluid flowing in the second supply pipe 66 into the measurement piping 70. Therefore, even if sludge enters the measurement piping 70 from the work-pan 42, the working fluid supply portion 72 can return the sludge to the work-pan 42. It is thus possible to reduce accumulation of sludge in the measurement piping 70.

The working fluid supply portion 72 of this embodiment is connected to a portion of the measurement piping 70 on a side opposite to an opening OP of the measurement piping 70. It is therefore likely that the working fluid supplied to the measurement piping 70 smoothly flows to the opening OP of the measurement piping 70 without convection in the measurement piping 70. Consequently, accumulation of sludge in the measurement piping 70 can be further reduced as compared to cases where the working fluid supply portion 72 is connected to a portion other than the portion on the opposite side to the opening OP of the measurement piping 70.

The cover member 74 covers the opening OP of the measurement piping 70 from an upper side of the opening OP in such a manner that the working fluid supplied to the measurement piping 70 can move to the work-pan 42, so as to suppress entrance of the sludge into the measurement piping 70 from the work-pan 42. The cover member 74 of this embodiment is disposed in the work-pan 42 to extend from above the opening OP of the measurement piping 70, and the cover member 74 is positioned in front of the opening OP at an interval from the opening OP.

The pressure sensor 76 detects a pressure of the air space SP in the measurement piping 70 and outputs the detected results to the control unit 78. The pressure sensor 76 of this embodiment is provided outside the measurement piping 70 and detects the pressure of the air space SP through a tube 76a inserted through a wall of the measurement piping 70 and coupled to the air space SP. Consequently, as compared to cases where the pressure sensor 76 is provided in the air space SP of the measurement piping 70, the pressure sensor 76 is prevented from contacting the working fluid.

The control unit 78 controls the actuator connected to the valve V1 and the pumps P1 to P3 so that the working fluid circulates between the work-pan 42 and the dielectric fluid unit 16. That is, the control unit 78 makes the working fluid circulate between the work-pan 42 and the dielectric fluid unit 16 by controlling the actuator connected to the valve V1 and driving the pumps P1 to P3 with the valve V1 opened.

In this condition, the control unit 78 measures the level of the working fluid stored in the work-pan 42 based on the pressure outputted from the pressure sensor 76, adjusts the opening of the valve V1 according to the measured level, and thereby maintains substantially constant the level of the working fluid stored in the work-pan 42.

[Modifications]

The above embodiment has been described as an example of the present invention, and the technical scope of the present invention is not limited to the scope described in the embodiment above. Various modifications or improvements can of course be applied to the above-described embodiment. It is clear from the description of claims that embodiments thus modified or improved in various ways are included in the technical scope of the present invention.

Some of modified or improved embodiments will be described below as modifications. Constituent elements that are equivalent to those described in the embodiment above will be labeled using the same reference numerals, and overlapping descriptions thereof will not be repeated.

[Modification 1]

Figure 3:
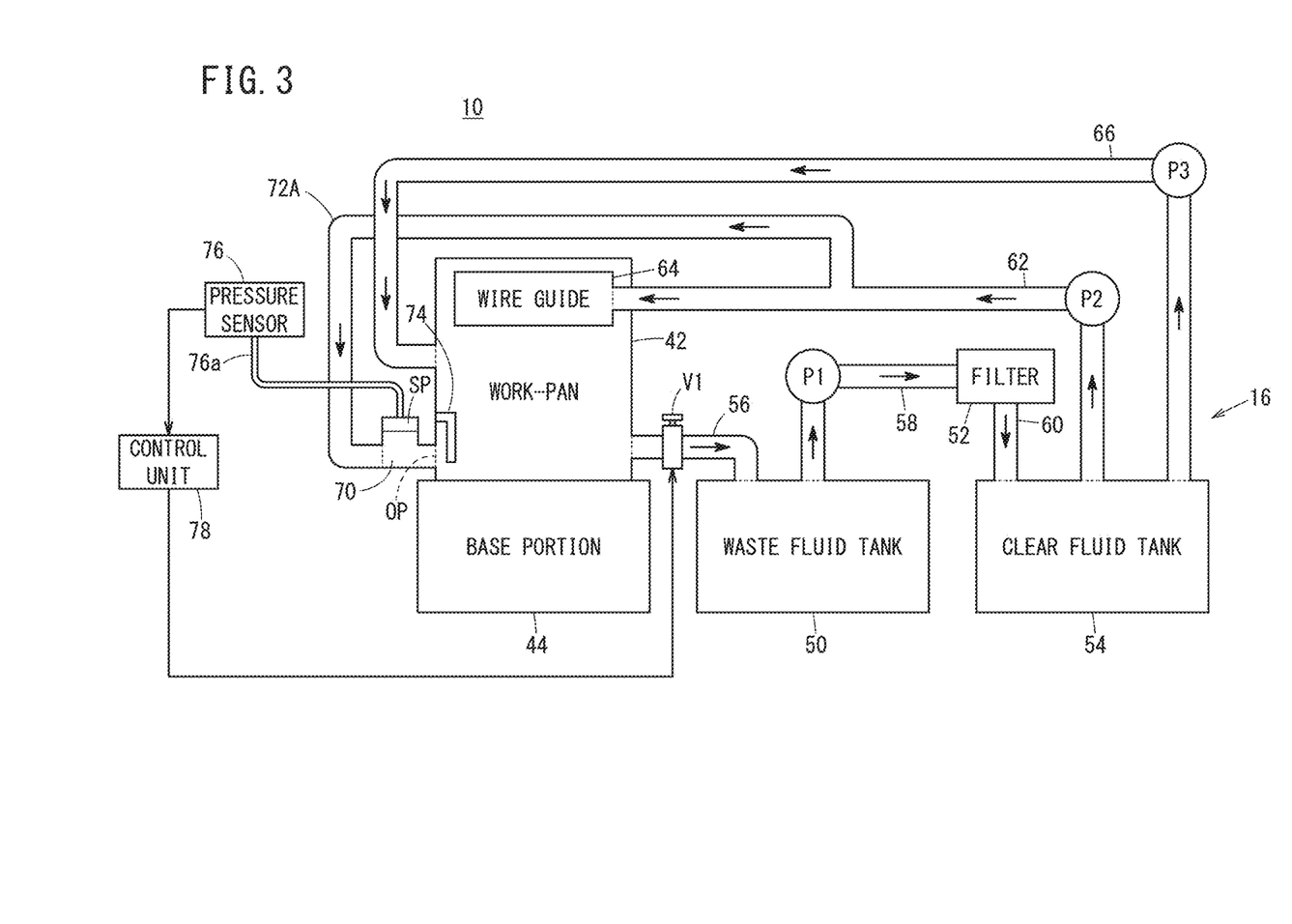
FIG. 3 is a diagram showing the configuration of main parts of an electric discharge machine according to Modification 1.

FIG. 3 is a diagram illustrating the configuration of main parts of an electric discharge machine 10 according to Modification 1. The electric discharge machine 10 of Modification 1 adopts a working fluid supply portion 72A in place of the working fluid supply portion 72 of the above-described embodiment. While the working fluid supply portion 72 of the above-described embodiment is a pipe that branches off from the second supply pipe 66, the working fluid supply portion 72A of Modification 1 is a pipe that branches off from the first supply pipe 62.

As mentioned above, the working fluid flowing in the first supply pipe 62 is at a higher pressure than the working fluid flowing in the second supply pipe 66. Accordingly, since the working fluid supply portion 72A of Modification 1 supplies the measurement piping 70 with the working fluid flowing in the first supply pipe 62, it is easier to force the sludge to flow to the work-pan 42. This further reduces accumulation of the sludge in the measurement piping 70 as compared to the case of the working fluid supply portion 72 of the above-described embodiment.

Incidentally, when the working fluid supply portion 72 of the above-described embodiment is adopted, the working fluid flows to the measurement piping 70 at a pressure lower than the case of the working fluid supply portion 72A of Modification 1. Accordingly, it is less likely that the working fluid at a pressure exceeding the limit of detection of the pressure sensor 76 flows to the measurement piping 70. As a result, when the working fluid supply portion 72 of the above-described embodiment is adopted, it is easy to widen the choice of the pressure sensor 76 that can be employed.

[Modification 2]

Figure 4:
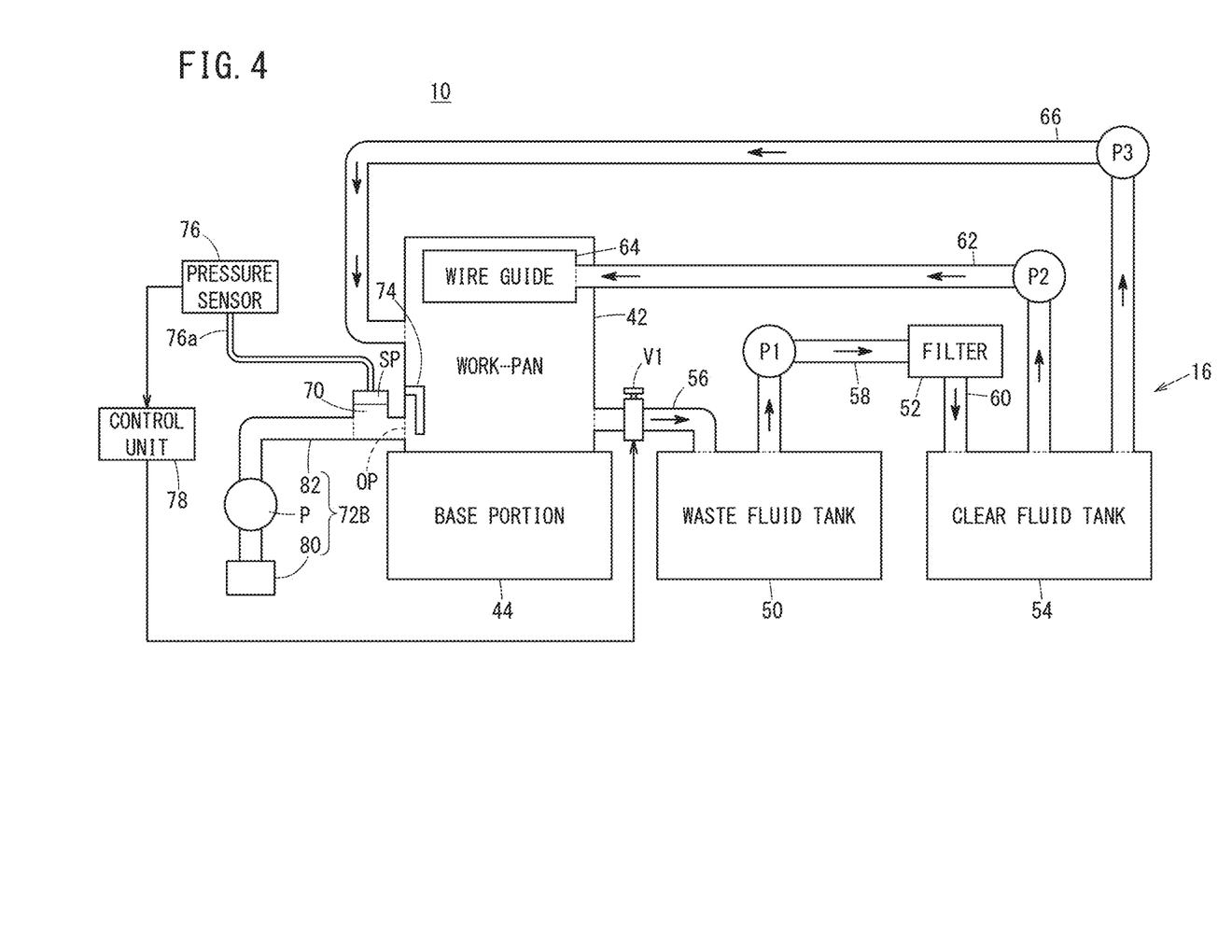
FIG. 4 is a diagram showing the configuration of main parts of an electric discharge machine according to Modification 2.

FIG. 4 is a diagram illustrating the configuration of main parts of an electric discharge machine 10 according to Modification 2. The electric discharge machine 10 of Modification 2 adopts a working fluid supply portion 72B in place of the working fluid supply portion 72 of the above-described embodiment. The working fluid supply portion 72 of the above-described embodiment is a pipe that branches off from the second supply pipe 66 of the dielectric fluid unit 16.

On the other hand, the working fluid supply portion 72B of Modification 2 is provided outside of the dielectric fluid unit 16. The working fluid supply portion 72B includes a dedicated tank 80 that is dedicated to the measurement piping 70, for storing working fluid containing no sludge, a pipe 82 connecting the measurement piping 70 and the dedicated tank 80, and a pump P provided to the pipe 82. The working fluid supply portion 72B pumps up the working fluid from the dedicated tank 80 by the pump P and supplies the pumped working fluid to the measurement piping 70 through the pipe 82. Similarly to the above-described embodiment, adopting the working fluid supply portion 72B constructed in this way also reduces accumulation of sludge in the measurement piping 70.

Incidentally, when the working fluid supply portion 72 of the above-described embodiment is adopted, part of the working fluid flowing in the second supply pipe 66 of the dielectric fluid unit 16, from which sludge has been removed, can be employed as a working fluid for cleaning the measurement piping 70. Similarly, when the working fluid supply portion 72A of Modification 1 is adopted, part of the working fluid flowing in the first supply pipe 62 of the dielectric fluid unit 16, from which sludge has been removed, can be employed as a working fluid for cleaning the measurement piping 70. That is, when the working fluid supply portion 72, 72A is adopted, it is not necessary to provide a structure such as the working fluid supply portion 72B for supplying a working fluid that is dedicated to the measurement piping 70, separately from the dielectric fluid unit 16. As a result, when the working fluid supply portion 72, 72A is adopted, it is possible to reduce accumulation of sludge in the measurement piping 70 by a simple structure.

[Modification 3]

Figure 5:
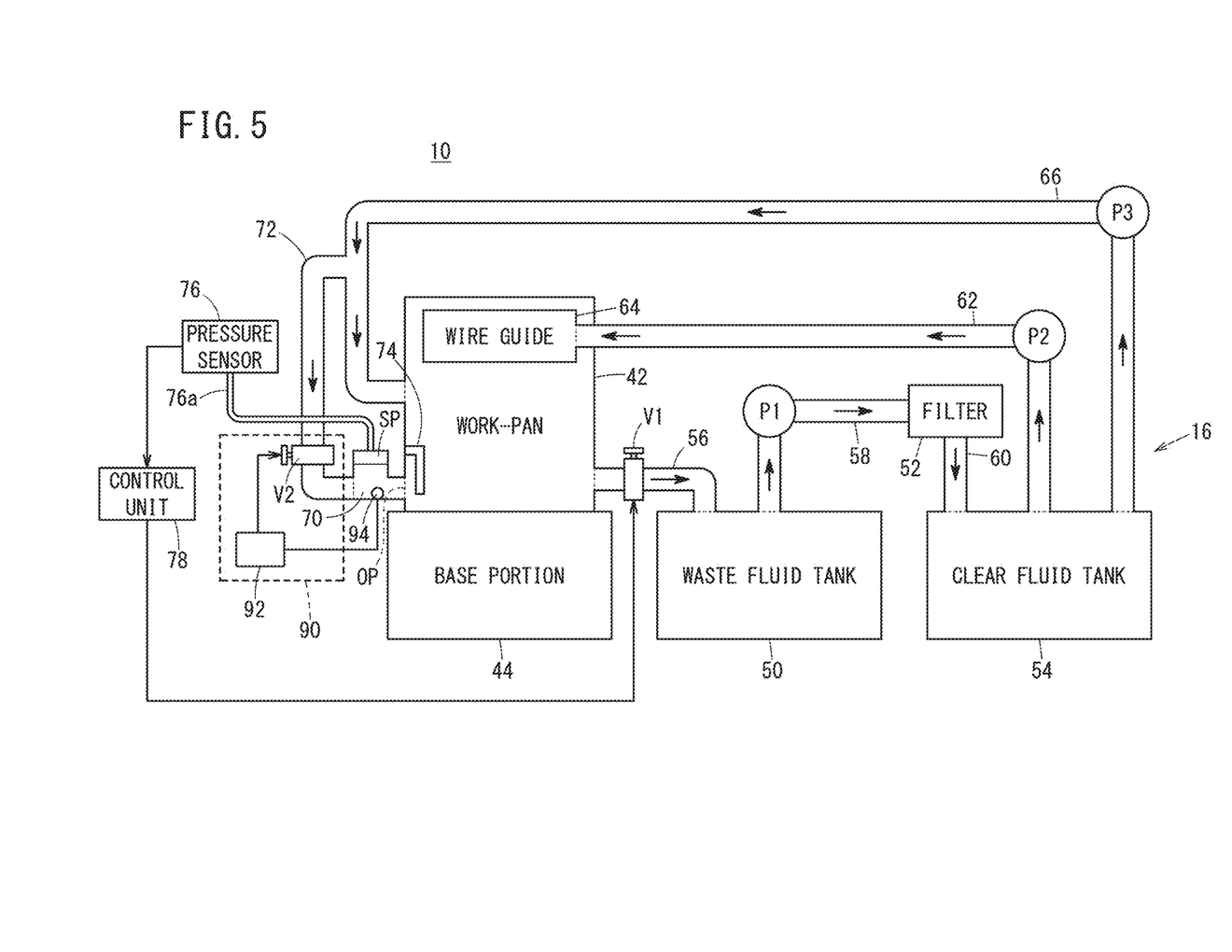
FIG. 5 is a diagram showing the configuration of main parts of an electric discharge machine according to Modification 3.

FIG. 5 is a diagram illustrating the configuration of main parts of an electric discharge machine 10 according to Modification 3. The electric discharge machine 10 of Modification 3 further includes a fluid amount adjusting portion 90 configured to adjust the amount of working fluid supplied to the measurement piping 70.

The fluid amount adjusting portion 90 includes a valve V2 provided to the working fluid supply portion 72 and a valve control portion 92 configured to adjust an opening of the valve V2 by controlling an actuator connected to the valve V2. The opening of the valve V2 includes the case where the valve V2 is closed.

The valve control portion 92 adjusts the amount of working fluid supplied to the measurement piping 70 based on an elapsed time of the electric discharge machining. Specific examples of the adjusting method include, for example, a method in which the opening of the valve V2 is increased as the elapsed time of electric discharge machining becomes longer, or a method in which the valve V2 is opened after a certain time has elapsed from the beginning of electric discharge machining.

In this way, by adjusting the amount of working fluid based on the elapsed time of electric discharge machining, it is possible to reduce, or set to zero, the amount of working fluid that is supplied to the measurement piping 70 at or immediately after the beginning of the electric discharge machining when sludge is less likely to accumulate in the measurement piping 70. This reduces consumption of the working fluid.

Further, the valve control portion 92 may be configured to obtain a concentration of the sludge contained in the working fluid from a concentration sensor 94 provided in the measurement piping 70, and adjust the amount of working fluid supplied to the measurement piping 70 based on the concentration.

Specific examples of the adjusting method include, for example, a method in which the opening of the valve V2 is made larger as the concentration obtained as a result of detection by the concentration sensor 94 becomes larger. The concentration sensor 94 can be, for example, an ion counter or an absorptiometer for detecting a component concentration of, e.g., iron component of the sludge. The concentration sensor 94 may be provided inside the work-pan 42.

In this way, by adjusting the amount of working fluid based on the concentration of sludge contained in the working fluid, it is possible, similarly to the case described above, to reduce the amount of working fluid that is supplied to the measurement piping 70 in periods in which sludge is less likely to accumulate in the measurement piping 70. This reduces consumption of the working fluid.

Although the example above adopts the valve control portion 92 to control the actuator connected to the valve V2, the control unit 78 described earlier may be adopted. Adopting the control unit 78 eliminates the need for the valve control portion 92, reducing the number of components.

[Modification 4]

In the embodiment described above, the measurement piping 70 is coupled to a side wall of the work-pan 42, but the measurement piping 70 may be coupled to a wall portion other than a side wall.

[Modification 5]

In the embodiment described above, the pressure sensor 76 is provided outside the measurement piping 70, but the pressure sensor 76 may be provided at the air space SP in the measurement piping 70. This eliminates the need for the tube 76a and simplifies the structure. However, for the purpose of suppressing contact between the pressure sensor 76 and the working fluid, it is preferable to provide the pressure sensor 76 outside the measurement piping 70 as in the above-described embodiment.

[Modification 6]

In the embodiment described above, the electric discharge machine 10 is a wire electric discharge machine that performs electric discharge machining by electric discharge occurring between the wire electrode 12 and the workpiece W, but the electric discharge machine 10 may be a die-sinking electric discharge machine that performs electric discharge machining by electric discharge occurring between a die-sinking electrode and workpiece W. Such a die-sinking electric discharge machine performs machining on a workpiece while relatively moving the position of a table disposed in the work-pan 42 and the position of the die-sinking electrode. When the electric discharge machine 10 is a die-sinking electric discharge machine, the supplying system 20a and the collecting system 20b are omitted and an actuator for moving the position of the die-sinking electrode is provided.

[Modification 7]

The above-described embodiment and Modifications 1 to 6 may be arbitrarily combined within a range where no contradiction is incurred.

[Technical Ideas]

Technical ideas that can be grasped from the above-described embodiment and Modifications will be described below.

An electric discharge machine (10) is configured to perform electric discharge machining on a workpiece in a working fluid stored in a work-pan (42). The electric discharge machine (10) includes: a measurement pipe (70) coupled to the work-pan (42) and having an air space (SP) inside; a pressure sensor (76) configured to detect a pressure at the air space (SP); and a working fluid supply portion (72, 72A, 72B) configured to supply the working fluid to the measurement pipe (70).

In the electric discharge machine (10), sludge that has entered the measurement pipe (70) from the work-pan (42) can be forced to flow to the work-pan (42) by the working fluid supplied to the measurement pipe (70). Thus, according to the electric discharge machine (10), it is possible to reduce accumulation of the sludge inside the measurement pipe (70).

The working fluid supply portion (72, 72A) may be a pipe that branches off from a supply pipe (62, 66) of a dielectric fluid unit (16) configured to remove, from the working fluid, sludge produced in the work-pan (42) and return the sludge-removed working fluid back to the work-pan (42), the pipe being connected to the measurement pipe (70). Then, it is not necessary to provide a structure for supplying the working fluid that is dedicated to the measurement pipe (70) separately from the dielectric fluid unit (16). It is then possible to reduce accumulation of the sludge in the measurement pipe (70) by a simple structure.

The electric discharge machine (10) may be a wire electric discharge machine configured to perform electric discharge machining by an electric discharge occurring between a wire electrode (12) and the workpiece (W), the supply pipe (62, 66) may include a first supply pipe (62) for supplying the working fluid to a wire guide (64) disposed in the work-pan (42), and a second supply pipe (66) for supplying the working fluid to the work-pan (42) at a lower pressure than the working fluid flowing in the first supply pipe (62), and the working fluid supply portion (72) may branch off from the second supply pipe (66). Then, it is less likely that the working fluid at a pressure exceeding a limit of detection of the pressure sensor (76) flows to the measurement pipe (70). This makes it easy to widen the choice of the pressure sensor (76) that can be used.

The electric discharge machine (10) may further include a fluid amount adjusting portion (90) configured to adjust the amount of the working fluid supplied to the measurement pipe (70). Then, it is possible to reduce consumption of the working fluid as compared to cases where the amount of working fluid is kept constant.

The fluid amount adjusting portion (90) may be configured to adjust the amount of the working fluid based on an elapsed time of the electric discharge machining. Then, it is possible to reduce the amount of working fluid that is supplied to the measurement pipe (70) at or immediately after the beginning of the electric discharge machining when the sludge is less likely to accumulate in the measurement pipe (70).

The fluid mount adjusting portion (90) may be configured to adjust the amount of the working fluid based on a concentration of the sludge contained in the working fluid. Then, it is possible to reduce the amount of working fluid that is supplied to the measurement pipe (70) at or immediately after the beginning of the electric discharge machining when the sludge is less likely to accumulate in the measurement pipe (70).

The electric discharge machine (10) may further include a cover member (74) that covers, from an upper side, an opening (OP) of the measurement pipe (70) provided at a side wall of the work tank (42) in such a manner that the working fluid supplied to the measurement pipe (70) can move to the work-pan (42), so as to suppress entrance of the sludge into the measurement pipe (70) from the work-pan (42). Then, it is possible to further reduce accumulation of the sludge inside the measurement pipe (70) as compared to cases where the cover member (74) is absent.

What is claimed is:

1. An electric discharge machine configured to perform electric discharge machining on a workpiece in a working fluid stored in a work-pan, comprising:
   a measurement pipe coupled to the work-pan and having an air space inside;
   a pressure sensor configured to detect a pressure at the air space; and
   a working fluid supply portion configured to supply the working fluid to the measurement pipe,
   wherein the working fluid supply portion is a pipe that branches off from a supply pipe configured to supply to the work-pan working fluid from which sludge has been removed by a filter, the pipe being connected to the measurement pipe.

2. The electric discharge machine according to claim 1, wherein
   the electric discharge machine is a wire electric discharge machine configured to perform electric discharge machining by an electric discharge occurring between a wire electrode and the workpiece,
   the supply pipe includes a first supply pipe for supplying the working fluid to a wire guide disposed in the work-pan, and a second supply pipe for supplying the working fluid to the work-pan at a lower pressure than the working fluid flowing in the first supply pipe, and
   the working fluid supply portion branches off from the second supply pipe.

3. The electric discharge machine according to claim 1, further comprising a valve configured to adjust an amount of the working fluid supplied to the measurement pipe.

4. The electric discharge machine according to claim 3, wherein the valve is configured to adjust the amount of the working fluid based on an elapsed time of the electric discharge machining.

5. The electric discharge machine according to claim 3, wherein the valve is configured to adjust the amount of the working fluid based on a concentration of sludge contained in the working fluid.

6. The electric discharge machine according to claim 1, wherein
   the measurement pipe has an opening at a side surface of the work-pan, and
   the electric discharge machine further comprises a cover member that is provided at the side surface of the work-pan and covers the opening from an upper side of the opening in such a manner that the working fluid supplied from the supply pipe to the measurement pipe can move to the work-pan through the opening.

* * * * *